United States Patent
Pinnow et al.

[11] 4,197,008
[45] Apr. 8, 1980

[54] ELECTRO-OPTIC TUNABLE OPTICAL FILTER

[75] Inventors: Douglas A. Pinnow; Richard L. Abrams, both of Pacific Palisades; James F. Lotspeich, Malibu, all of Calif.

[73] Assignee: Hughes Aircraft Company, Culver City, Calif.

[21] Appl. No.: 864,356

[22] Filed: Dec. 27, 1977

[51] Int. Cl.² .............................................. G02F 1/03
[52] U.S. Cl. ................................................... 356/150
[58] Field of Search ........................................ 350/150

[56] References Cited

U.S. PATENT DOCUMENTS

| | | | |
|---|---|---|---|
| 2,834,254 | 5/1968 | Sage | 350/150 |
| 3,915,553 | 10/1975 | Adams et al. | 350/150 |
| 3,938,878 | 2/1976 | Fox | 350/150 |

OTHER PUBLICATIONS

Billings, B. H., "The Electro-Optic Effect in Uniaxial Crystals of the Type XH₂PO₄", *Journal of the Optical Society of America,* vol. 39, No. 10, Oct. 1949, pp. 797-801.
Solc, I., "Birefringent Chain Filter", *Journal of the Optical Society of America,* vol. 55, No. 6, Jun. 1965, pp. 621-625.
Drichko, et al. "Narrow-Band Electrically Controlled Interference-Polarizing Filter for Solar Physics Studies", *Optics & Spectroscopy,* vol. 31, No. 3, Sep. 1971, pp. 241-243.

*Primary Examiner*—F. L. Evans
*Assistant Examiner*—R. A. Rosenberger
*Attorney, Agent, or Firm*—Paul M. Coble; W. H. MacAllister

[57] ABSTRACT

Electronically tunable optical filters are disclosed wherein a spatially varying dc electric field is applied to successive regions of a birefringent crystalline medium disposed between a pair of suitably oriented polarizers along the path of a light beam to be filtered. The dc electric field, which may be either parallel or perpendicular to the light path, electro-optically produces in the birefringent medium an effective oscillation of the optic axis of the medium about the pass direction of the input polarizer in a plane perpendicular to the light path as a function of distance along the light path with a predetermined spatial variation to achieve a desired filter transmission characteristic. The electric field is generated from programmable control voltages to provide a wide variety of filter passband or stopband characteristics.

15 Claims, 15 Drawing Figures

ELECTRO-OPTIC TUNABLE OPTICAL FILTER

BACKGROUND OF THE INVENTION

1. Field of the Invention

This invention relates to optical filters, and more particularly it relates to an electronically tunable optical filter utilizing the electro-optic effect and capable of being programmed to provide a wide variety of filter transmission characteristics.

2. Description of the Prior Art Including Prior Art Statement

One form of optical filter was described by Ivan Solc in an article "Birefringent Chain Filters", *Journal of the Optical Society of America*, Vol. 55, No. 6 (June 1965), pp. 621–625. In this filter a series of birefringent plates is disposed along the direction of propagation of a light beam between a pair of polarizers having their respective pass directions for polarized light disposed orthogonal to one another. The respective optic axes of successive birefringent plates are oriented at alternating positive and negative small angles of like magnitude with respect to the pass direction of the input polarizer. Light is transmitted through the filter over narrow passbands surrounding wavelengths for which the individual birefringent plates perform as half-wave plates or odd multiple half-wave plates. Since the pass wavelengths are determined by the plate thickness and the birefringence of the plate material, in a filter of the Solc type the pass wavelengths are limited to particular fixed values.

An electronically tunable optical filter has been disclosed by Steven E. Harris in U.S. Pat. No. 3,679,288, issued July 25, 1972, and by Harris and his co-workers in the publications "Acousto-Optic Tunable Filter", *Journal of the Optical Society of America*, Vol. 59, No. 6 (June 1969), pp. 744–747; "Electronically Tunable Acousto-Optic Filter", *Applied Physics Letters*, Vol. 15, No. 10 (Nov. 15, 1969), pp. 325–326; and "CaMoO$_4$ electronically Tunable Optical Filter", *Applied Physics Letters*, Vol. 17, No. 5 (Sept. 1, 1970), pp. 223–225. In this type of filter, a light wave of one polarization is diffracted into an orthogonal polarization by propagating through a birefringent crystal (disposed between a pair of crossed polarizers) collinearly with an acoustic wave generated in the crystal. This diffraction occurs for a narrow band of light frequencies satisfying the relation that the sum of the momentum vectors of the incident light and acoustic waves equals the momentum vector of the output light wave. By changing the acoustic frequency, the light frequency which is most effectively diffracted into the orthogonal polarization is varied, and the filter passband is changed accordingly.

Since the acousto-optic filter requires a traveling acoustic wave which is lost from the system after one transit through the crystal, power is continually required to generate new acoustic waves of transitory lifetimes. As a result, this type of filter consumes a large amount of power. Moreover, the filter requires an electro-acoustic transducer to convert the electrical control signals into acoustic waves. Since the frequency response of such transducers is limited, not only is a bandwidth limitation imposed on the optical tuning range, but excessive bulk acoustic absorption may occur at higher frequency Fourier components when the transducer is driven at harmonics of its fundamental frequencies.

Another form of optical filter is a multilayer interference filter consisting of alternate layers of materials having high and low indices or refraction. When an electric field is applied across such a filter, a change in the magnitude of the index of refraction occurs in accordance with the electro-optic effect to change the optical path length through the filter and thereby vary the filter passband. Optical filters of this type are disclosed as components of light shutters in U.S. Pat. Nos. 2,960,914 and 3,164,665, both entitled "Electro-Optical Light Shutter". The index of refraction change (hence the passband shift) achievable with multilayer interference optical filters for practical values of applied voltage is sufficiently small to limit the usefulness of such filters to particular applications such as the light shutters of the aforementioned patents. Moreover, such filters cannot be electrically programmed to provide multiple passbands or a single passband of variable bandwidth.

The electro-optic effect also has been utilized to achieve light modulation by changing the magnitude of the indices of refraction of an electro-optic crystal in accordance with a time varying modulating voltage. A light modulator of this type is disclosed in U.S. Pat. No. 4,054,362 entitled "Device for Modulating Light". Although this patent refers to use of the device as a controlled filter, such a filter is not electronically tunable, i.e., its pass or stop wavelengths are not variable in accordance with an applied electrical signal.

SUMMARY OF THE INVENTION

It is an object of the present invention to provide an electro-optic tunable optical filter which is electronically tunable over a very wide passband and which consumes substantially less power than acousto-optic tunable optical filters.

It is a further object of the invention to provide a highly versatile electronically tunable optical filter which may be electronically programmed to provide an extremely wide variety of transmission characteristics.

An optical filter according to the invention includes first and second polarizers spaced from one another along a light path and having their respective pass directions for polarized light oriented at a desired angular relationship with respect to one another. A birefringent crystalline medium disposed along the light path between the first and second polarizers and oriented with its optic axis perpendicular to the light path has at least one non-zero electro-optic coefficient selected from the group consisting of the coefficients $r_{41}$, $r_{42}$, $r_{43}$, $r_{51}$, $r_{52}$, $r_{53}$, $r_{61}$, $r_{62}$ and $r_{63}$. A beam of light including a plurality of wavelengths is directed through the first polarizer and the birefringent medium along the aforementioned path.

There is applied to successive regions of the birefringent medium along the light path a dc electric field which is spatially varying along the light path. The dc electric field electro-optically produces in the birefringent medium an effective variation of the optic axis of the medium about the pass direction of the first polarizer in a plane perpendicular to the light path as a function of distance along the light path with a predetermined spatial variation such that at least one of the wavelengths in the light beam is passed by the second polarizer and at least another of the wavelengths is rejected by the second polarizer in accordance with a desired transmission characteristic as a function of wavelength for light transversing the filter along the aforementioned path.

Additional objects, advantages and characteristic features of the invention will become readily apparent from the following detailed description of preferred embodiments of the invention when considered in conjunction with the accompanying drawings.

DESCRIPTION OF THE PREFERRED EMBODIMENTS

Figures 1, 2, 3:
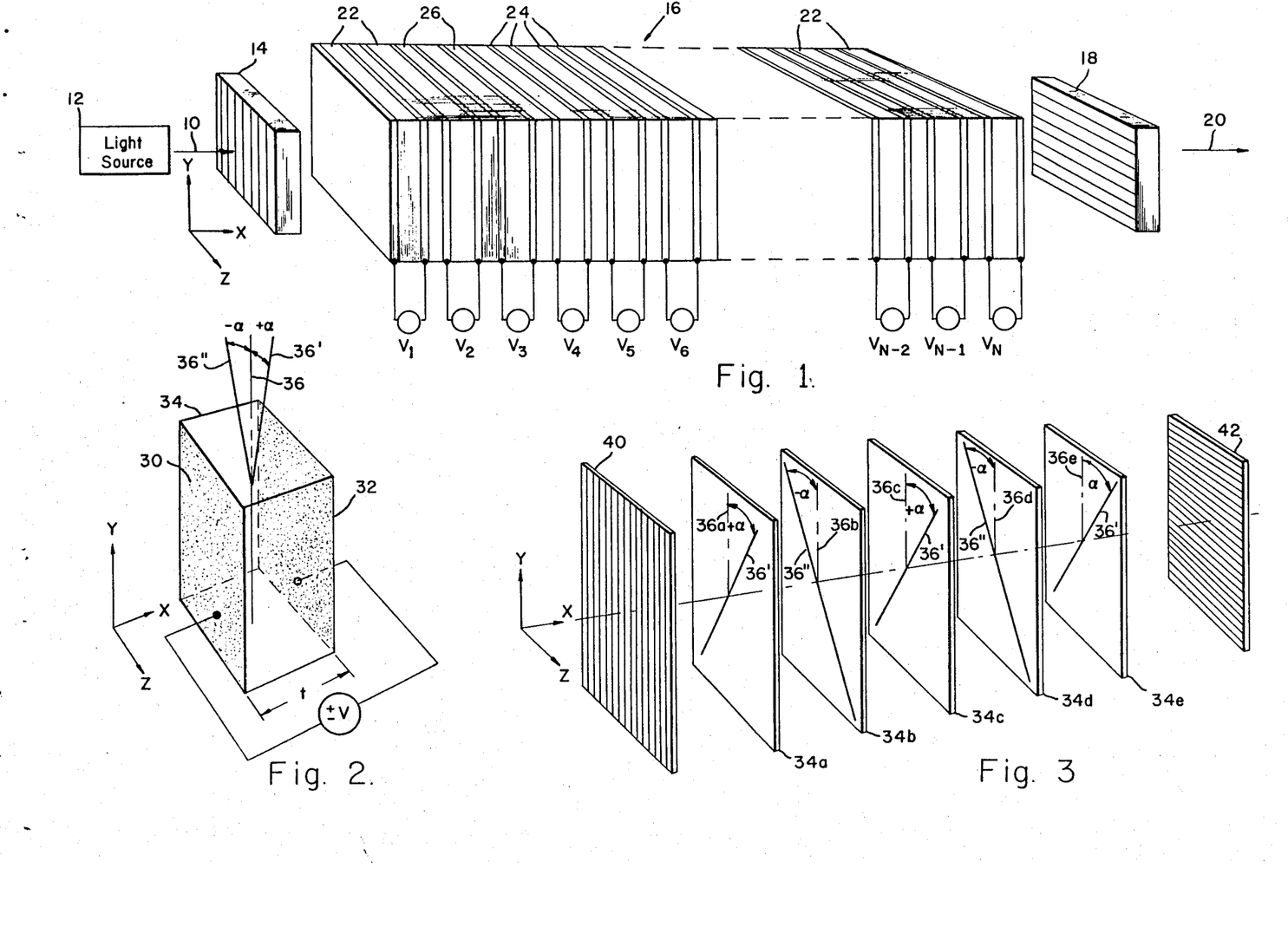
FIG. 1 is a perspective view illustrating an electro-optic tunable optical filter according to one embodiment of the invention.
FIG. 2 is a perspective view illustrating the effect of applying a voltage across an individual crystal which may be employed in the embodiment of FIG. 1 and used in explaining the operation of a filter according to the invention.
FIG. 3 is a perspective view, partly in exploded form, illustrating the effect of the application of respective voltages to successive crystal plates which may be employed in the filter of FIG. 1 and used in further explaining the operation of the filter.

Referring to FIG. 1 with greater particularity, an input beam or ray of light 10 to be applied to an electro-optic tunable filter according to the invention may be generated by a suitable light source 12. The light source 12 may be a narrow band coherent source such as a laser or a broad band incoherent source such as glow discharge tube or an incandescent lamp. The light generated by the source 12 may lie in the visible, ultraviolet or infrared regions of the spectrum or may extend over portions of the spectrum overlapping more than more of these regions. If the source 12 generates multi-directional light, collimating reflectors and/or lenses may be provided, if desired, to increase the concentration of the light at the input to the filter.

In a filter according to the invention light beam 10 propagates through an input polarizer 14 which establishes a desired linear polarization for the light, an electro-optic crystal arrangement 16 to be described in more detail below, and an output polarizer, or analyzer, 18 which passes light polarized along a direction bearing a preselected angular relationship to the direction of polarization of the light emerging from the input polarizer 14. In the exemplary coordinate system illustrated in FIG. 1, light beam 10 is propagated along the X-direction, polarizer 14 is oriented so as to polarizer light along the Y-direction, and analyzer 18 is oriented to pass light polarized along the Z-direction, thereby providing a desired output beam 20.

It is pointed out that when the polarizer 14 and analyzer 18 are oriented with their pass directions perpendicular to one another as shown in FIG. 1, a bandpass filter is provided wherein the output light beam 20 consists of a selected wavelength or wavelength range within the wavelength range of the input beam 10. However, polarizer 14 and analyzer 18 may be oriented with their pass directions parallel to one another, in which case a stop band filter would be provided wherein the output light beam 20 passed by the analyzer 18 would include all wavelengths within the wavelength range of the input beam 10 except for a selected wavelength or wavelengths to be blocked.

The electro-optic crystal arrangement 16 basically includes a birefringent crystalline medium and a number of electrodes to which programmable control voltages are applied to produce a spatially varying dc electric field along the direction of light propagation through the crystalline medium. The spatial variation of this electric field is controlled by the programmable voltages in accordance with the wavelengths desired to be passed or stopped by the filter. The birefringent crystalline medium may comprise either a series of individual crystals or a single crystal having a series of electro-optic interaction regions associated with the various electrodes. A detailed discussion concerning various crystal types and materials which may be employed is given below.

In the embodiment illustrated in FIG. 1, the birefringent crystalline medium includes a series of crystal plates 22 disposed sequentially along the X-direction with their opposite broad planar surfaces parallel to the Y-Z plane. As shown, the respective optic axes of the crystal plates 22 are disposed parallel to the direction of the polarized light emerging from the polarizer 14, i.e., along the Y-direction.

In order to apply an electric field across the crystal plates 22, electrodes 24 of a material transparent to light wavelengths in the input beam 10 are attached to the opposite broad surfaces of each crystal 22. An example of a specific material which may be used for the electrodes 24 when processing white or infrared light is indium-tin oxide (ITO), although it should be understood that other materials are also suitable and may be employed. The crystal plates 22 may be bonded together into a stack arrangement by means of layers 26 of a transparent epoxy between adjacent electrodes 24 of neighboring crystal plates 22. An exemplary epoxy which may be employed for the layers 26 when processing white or infrared light is M bond 610 manufactured by Micro-Measurements, Romulus, Michigan 48174. In order to provide the aforementioned spatially varying dc electric field along the length of the arrangement 16, a plurality of dc control voltages $V_1, V_2, V_3 \ldots V_N$ are applied between electrodes 24 of the respective first, second, third ... Nth crystal plates 22.

Figures 4, 4A, 4B, 4C, 7:
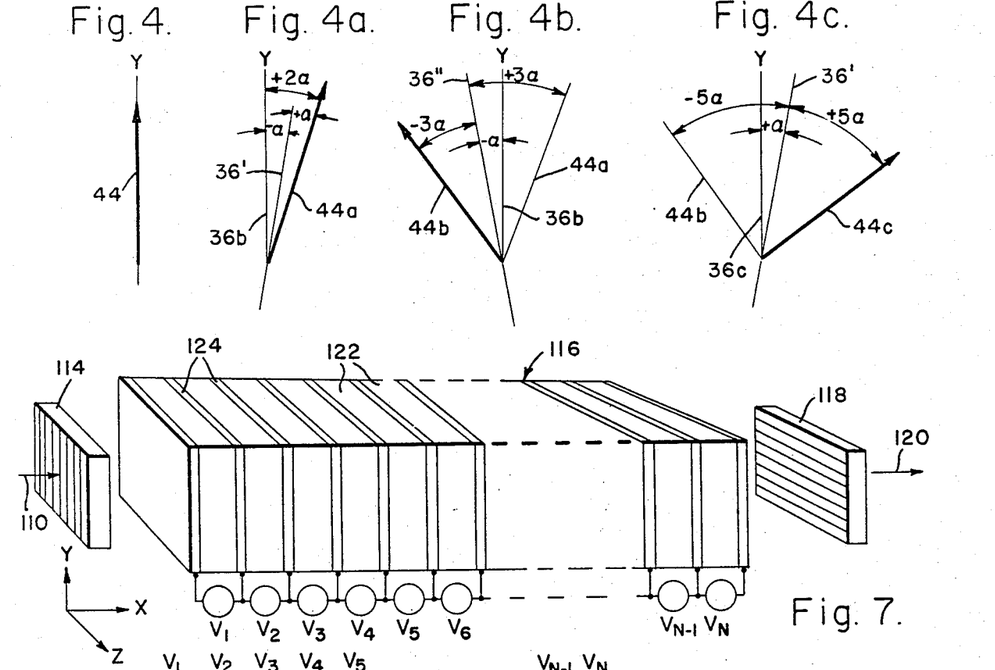
FIGS. 4, 4a, 4b and 4c are diagrams used in conjunction with FIG. 3 to explain the operation of a filter according to the invention.
FIGS. 7 and 8 are perspective views illustrating respective electro-optic tunable optical filters in accordance with further embodiments of the invention.

Before describing the operation of the electro-optic tunable filter of FIG. 1, the theory underlying the operation of the filter will be developed with reference to FIGS. 2, 3 and 4. FIG. 2 illustrates the effect of applying a voltage V between planar electrodes 30 and 32 disposed on opposite broad surfaces of a birefringent crystal 34 having its optic axis 36 disposed parallel to the Y-axis and with the electrodes 30 and 32 disposed parallel to the Y-Z plane in the coordinate system of FIG. 2. The application of a voltage V between the electrodes 30 and 32 causes the optic axis 36 of the crystal 34 to effectively rotate about the X-axis to a new location 36' at an angle $+\alpha$ with respect to the original optic axis 36. Similarly, application of a voltage $-V$ between the crystal electrodes 30 and 32 effectively shifts the optic axis to a location 36'' at an angle $-\alpha$ with respect to the original optic axis 36. The relationship between the applied voltage V and the optic axis rotation angle $\alpha$ is given by $$V = 2\bar{n} t \Delta n \tan \alpha / n_o^2 n_e^2 r_{ij} \qquad (1),$$

where $n_o$ and $n_e$ are the respective ordinary and extraordinary indices of refraction for the crystal 34, $\Delta n$ is the static birefringence of the crystal (i.e., $\Delta n = n_o - n_e$), $\bar{n}$ represents the average of $n_o$ and $n_e$, t is the thickness of the crystal as measured along the X-axis, and $r_{ij}$ is the appropriate electro-optic coefficient as will be discussed more fully below. Since the optic axis rotation angle $\alpha$ of interest is usually very small, $\tan \alpha \simeq \alpha$, and it may be seen from Equation (1) that the axis rotation angle $\alpha$ is approximately proportional to the applied voltage V.

Assume that a series of birefringent crystal plates 34a, 34b, 34c, 34d and 34e are sequentially disposed along the X-axis between a pair of crossed polarizers 40 and 42 as shown in FIG. 3. The polarizers 40 and 42 may be the same as the respective polarizers 14 and 18 of FIG. 1. Crystal plates 34a, 34b, 34c, 34d and 34e have their respective optic axes 36a, 36b, 36c, 36d and 36e aligned with one another along the Y-axis, i.e., the pass direction of the input polarizer 40. Assume further that respective voltages are applied across the respective crystal plates 34a, 34b, 34c, 34d and 34e to alternately shift their respective optic axes 36a, 36b, 36c, 36d and 36e to new directions 36' and 36'' at respective angles $+\alpha$ and $-\alpha$ with respect to the Y-axis. Thus, light polarized in the Y-direction which propagates along the X-axis "sees" a series of crystal plates having their respective optic axes alternately disposed at angles $+\alpha$ and $-\alpha$ with respect to its direction of polarization.

If each of the crystal plates 34a, 34b, 34c, 34d and 34e has the same thickness t and the same birefringence $\Delta n$, a light wavelength $\lambda_o$ will exist for which each crystal plate functions as a half-wave plate. Specifically, half-wave plates or odd multiple half-wave plates will be provided for light of wavelengths $\lambda_o$ satisfying the relation $$(\lambda_o/2)(1+2M) = t\Delta n \qquad (2),$$

where M is zero or a positive integer. It is well known that when light incident upon a half-wave plate is polarized at a given angle with respect to the optic axis of the half-wave plate, the half-wave plate will function to provide output light having its polarization rotated to an angle of the same magnitude on the opposite side of the optic axis from the input direction.

The passage of polarized light of a wavelength satisfying Equation (2) through the array of crystal plates shown in FIG. 3 is schematically illustrated in FIGS. 4, 4a, 4b and 4c. In FIGS. 4–4c arrow 44 represents the polarization direction of light passing through the array. It may be seen from FIG. 4 that after passing through polarizer 40, the light 44 is polarized along the Y-axis. As was indicated above, a voltage is applied across the first crystal plate 34a to rotate its optic axis 36a to the direction 36'. Thus, the light 44 enters the crystal plate 34a offset from optic axis 36' by the angle $-\alpha$, and upon passing through the crystal plate 34a, is rotated to a position offset from the optic axis 36' by the angle $+\alpha$, as shown by arrow 44a of FIG. 4a. It may be seen from FIG. 4a that the light 44a leaving the first crystal plate 34a is offset from the Y-axis by an angle $+2\alpha$.

The voltage applied to the next crystal plate 34b is such that its optic axis 36'' makes an angle $-\alpha$ with respect to the Y-axis. Thus, the light 44a is incident upon the crystal plate 34b at an angle $+3\alpha$ with respect to the optic axis 36'', and upon passing through the crystal plate 34b, is rotated to an angle $-3\alpha$ with respect to the axis 36'', as shown by arrow 44b of FIG. 4b. Similarly, since the next crystal plate 34c has its optic axis shifted to the direction 36' at an angle $+\alpha$ with respect to the Y-axis, the light 44b is incident on crystal plate 34c at an angle $-5\alpha$ with respect to the optic axis 36', and the light emerges from the crystal 34c at an angle $+5\alpha$ with respect to the optic axis 36', as shown by arrow 44c of FIG. 4c.

It may be seen from the foregoing that as the polarized light propagates along the X-axis through successive crystal plates 34a–34e, a rocking effect occurs in which the polarization direction oscillates back and forth about the Y-axis as the light traverses successive crystal plates, with the magnitude of the rocking angle increasing by $2\alpha$ as each successive crystal plate is traversed. If the number of crystal plates in the array is selected so that the light leaving the last plate is polarized parallel to the Z-axis, all of the light will pass through the polarizer 42. Since each plate produces an additional movement of $2\alpha$ from the Y-axis, this condition may be achieved by selecting the number of plates N to satisfy the relation $$N = \pi/4\alpha \qquad (3).$$

However, even when the number of crystal plates differs somewhat from the value satisfying Equation (3), a significant component of polarized light will exit from the last plate parallel to the Z-axis and be passed by the polarizer 42. Of course, maximum transmission through the filter, theoretically approaching unity, is achieved when Equation (3), is satisfied.

When the light propagating through the crystal plate array of FIG. 3 is at a wavelength differing substantially from that which satisfies Equation (2), the crystal plates 34a–34e no longer function as half-wave plates, and the light does not exit from the last crystal plate polarized parallel to the pass direction of the polarizer 42. For example, when the wavelength of the light traversing the crystal plate array of FIG. 3 is at the wavelength $2\lambda_o$, each crystal plate 34a–34e appears as a quarter-wave plate rather than a half-wave plate. The polarization of light at this wavelength remains essentially parallel to the Y-axis throughout the entire array, with an occasional small circularly polarized component being present.

In an optical filter of the type described above, an optical passband is provided at a wavelength $\lambda$ given by $$\lambda = \Lambda \Delta n \qquad (4),$$

where $\Delta n$ is the static birefringence of the crystalline medium as defined above and where $\Lambda$ is the spatial period of an effective periodic variation of the optic axis of the crystalline medium along the direction of light propagation through the filter. In a filter according to the invention, this spatial period is varied electro-optically by means of predetermined control voltages.

In constructing an electro-optic tunable optical filter according to the invention a fixed spatial period $\Lambda_f$ for the crystal plates or regions used in providing the desired optic axis variation is determined from Equation (4) for the minimum wavelength $\lambda_{min}$ it is desired to pass through the filter. Since both a positive and a negative alternation must be provided during each fixed period $\Lambda_f$, this period must encompass two successive crystal plates or regions. Accordingly, the number N of crystal plates or regions and the length L of the electro-optic interaction region of the filter (the length of arrangement 16 in FIG. 1) may be determined from $$N\Lambda_f = 2L \qquad (5).$$

The number of crystal plates or regions N also may be selected to provide the desired bandwidth for the filter passband in accordance with the relation $$\Delta\lambda/\lambda_o = K\Lambda/N\Lambda_f \qquad (6),$$

where $\lambda_o$ is the desired pass wavelength of the filter, $\Delta\lambda/\lambda_o$ is the fractional bandwidth of the filter passband about the wavelength $\lambda_o$, and K is a proportionality constant determined by the level at which the bandwidth is defined. As a specific example, for a 3 db bandwidth, $K = 1.6$.

In designing a filter according to the invention, after the fixed spatial period $\Lambda_f$ has been determined from Equation (4) for the minimum pass wavelength $\lambda_{min}$, the number N of crystal plates or regions may be determined from Equation (6) according to the desired fractional bandwidth $\Delta\lambda/\lambda_o$ for an effective spatial period $\Lambda_o$ corresponding to the wavelength $\lambda_o$ via Equation (4). The incremental rocking angle $\alpha$ providing maximum transmission through the filter may then be found from Equation (3). Finally, the appropriate drive voltage V required to shift the optic axis of an individual crystal plate or region by the desired angle $\alpha$ may be calculated using Equation (1).

Figure 5A:
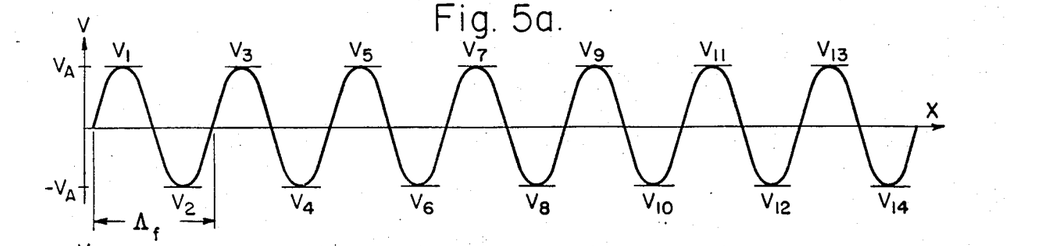
FIGS. 5a, 5b and 5c are graphs illustrating respective exemplary control voltage patterns applied to the filter of FIG. 1 as a function of longitudinal distance along the filter and used in further explaining the operation of the filter.

The operation of the electro-optic tunable optical filter of FIG. 1 will now be explained with reference to the control voltages depicted in FIGS. 5a, 5b and 5c. When it is desired that the filter pass light at the minimum design wavelength $\lambda_{min}$, control voltages are applied to produce an effective optic axis variation period $\Lambda$ coincident with the fixed period $\Lambda_f$. This may be achieved by programming the control voltages such that the odd numbered voltage sources $V_1$, $V_3$, $V_5$, etc. shown in FIG. 1 apply a like positive voltage $+V_A$ [of a magnitude determined by Equation (1) for the desired incremental rocking angle $\alpha$] across each odd numbered crystal plate 22 along the X-axis, while the even numbered voltage sources $V_2$, $V_4$, $V_6$, etc. apply a voltage $-V_A$ of the same magnitude but opposite polarity across each even numbered crystal plate 22 in the arrangement 16. The foregoing condition is illustrated in FIG. 5a.

When it is desired that the filter pass light at a wavelength three times the minimum wavelength $\lambda_{min}$, i.e., at $3\lambda_{min}$, the control voltages applied across the crystal plates 22 are programmed to provide an effective optic axis variation period $\Lambda$ equal to three times the fixed minimum period $\Lambda_f$, i.e., $\Lambda = 3\Lambda_f$. Exemplary control voltages for passing the wavelength $3\lambda_{min}$ are illustrated in FIG. 5b. As may be seen from FIG. 5b, positive voltages are applied to the first three crystal plates, negative voltages to the next three, positive voltages to the following three, and so on. Athough the voltages applied to the various crystal plates may have equal magnitude, it is preferable to vary the magnitude of successively applied voltages in sinusoidal fashion, as shown in FIG. 5b, in order to minimize the generation of undesired harmonics of the wavelength being passed.

Figure 5B:
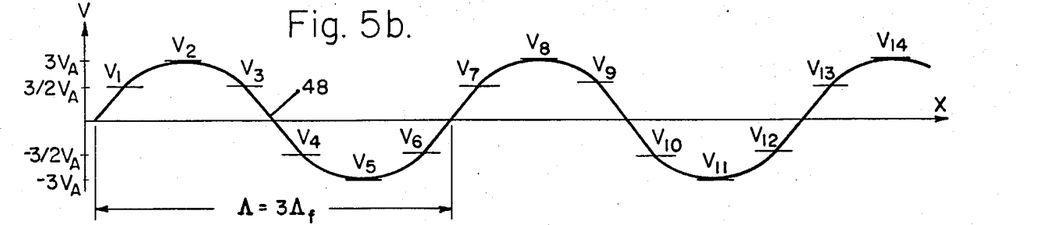
Figure 5C:
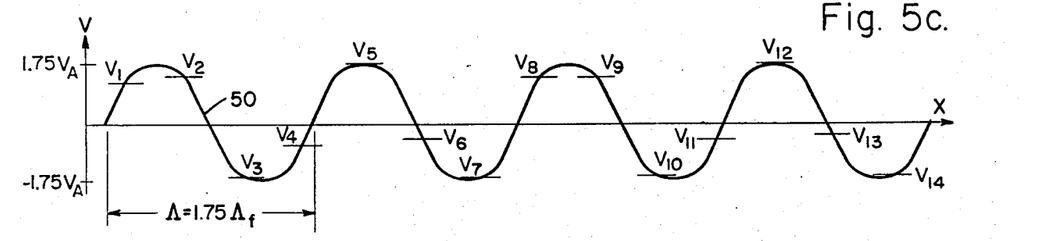

In the specific example illustrated in FIG. 5b, control voltages of maximum magnitude should be applied at points corresponding to the peaks and troughs of a sinusoidal variation 48 of period $3\Lambda_f$ along the X-axis, with the voltages applied to intermediate points along the X-axis having a magnitude corresponding to the magnitude of the sine wave 48 at the points in question. Moreover, since the passage of light at the wavelength $3\lambda_{min}$ produces only one third of the number of optic axis oscillations required for passing light of wavelength $\lambda_{min}$, a threefold increase in the incremental rocking angle $\alpha$ (hence the magnitude of the maximum drive voltage V) is required for maximum transmission of the wavelength $3\lambda_{min}$. Accordingly, in the specific exemplary control voltage pattern illustrated in FIG. 5b, voltages $V_2$, $V_5$, $V_8$, $V_{11}$, etc. occurring at the peaks and troughs of the sinusoidal variation 48 have a magnitude of $3V_A$, while the voltages $V_1$, $V_3$, $V_4$, $V_6$, etc. at intermediate points along the sine wave 48 have a magnitude of $3/2\ V_A$.

As a further example, assume it is desired that the filter of FIG. 1 pass light at a wavelength of $1.75\lambda_{min}$. An exemplary control voltage pattern for transmission of such a wavelength is illustrated in FIG. 5c. Appropriate values for the various control voltages $V_1$, $V_2$, $V_3$ ... $V_N$ may be determined by creating a sinusoidally varying curve 50 along the X-axis having a period $\Lambda = 1.75\Lambda_f$ and by choosing the magnitude and polarity of the voltages $V_1$, $V_2$, $V_3$. . . $V_N$ according to the instantaneous value of the curve 50 at respective points corresponding to the centers of the respective associated first, second, third . . . Nth crystal plates 22 along the X-axis. Also, for maximum transmission, the control voltage magnitude corresponding to the peaks and troughs of the sine wave 50 should be $1.75V_A$.

Figure 6A:
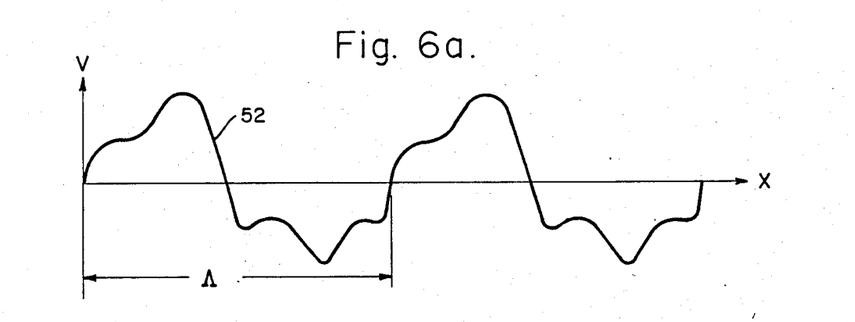
FIGS. 6a and 6b are graphs plotting an exemplary voltage as a function of position along a filter according to the invention and used in explaining the development of an appropriate control voltage pattern for a complex filter transmission characteristic.
Figure 6B:
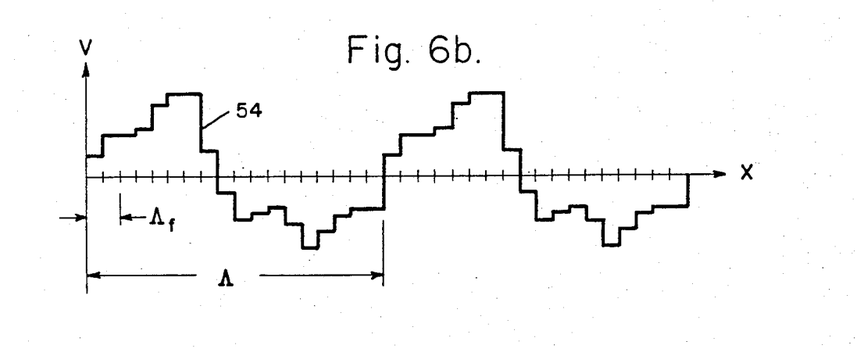

It should be apparent that a wide variety of programmable control voltage combinations may be employed to provide numerous different filter passband or stopband characteristics. In determining the appropriate control voltage pattern for a complex filter transmission characteristic, a waveform such as 52 of FIG. 6a is first developed representing the appropriate optic axis variation of period $\Lambda$ along the X-axis. For example, if a filter is desired having a pair of passbands centered at respective wavelengths of $4\lambda_{min}$ and $5\lambda_{min}$, a curve such as 52 would be produced by algebraically combining waveforms having respective periods of $4\lambda_{min}$ and $5\lambda_{min}$. The appropriate control voltage $V_N$ is then determined for each half fixed period $\Lambda_f/2$ according to the magnitude of the waveform 52 at the midpoint of the half period $\Lambda_f/2$ in question. The resultant control voltage pattern 54 corresponding to the waveform 52 is illustrated in FIG. 6b.

As was indicated above, an electro-optic tunable optical filter according to the invention may be fabricated using a single birefringent crystal rather than a plurality of individual crystals. An embodiment of the present invention employing a single crystal having alternating layers of high and low resistivity is illustrated in FIG. 7. Components in the embodiment of FIG. 7 which are the same as or which function equivalently to corresponding components in the embodiment of FIG. 1 are designated by the same second and third reference numerals as their corresponding components in FIG. 1, along with the addition of a prefix numeral "1".

In the embodiment of FIG. 7, an elongated single crystal 116 is disposed along the path of light beam 110. Crystal 116 may be grown, by liquid phase epitaxial techniques, for example, to have alternating regions 124 and 122 of low resistivity and high resistivity, respectively, along its length. As a specific example, the crystal 116 may be of silver thiogallate ($AgGaS_2$), with the low resistivity regions being created by doping with a suitable material such as bismuth or silver and the high resistivity regions remaining undoped. Typical exemplary resistivity values may be about 100 ohm-cm for the low resistivity regions 124 and about $10^{11}$ ohm-cm for the high resistivity regions 122. The respective control voltages $V_1, V_2, V_3 \ldots V_N$ are applied between respective pairs of successive low resistivity regions 124 to achieve the desired optic axis variation in the respective intermediate high resistivity regions 122 in the manner discussed above with reference to FIGS. 1–6.

Figure 8:
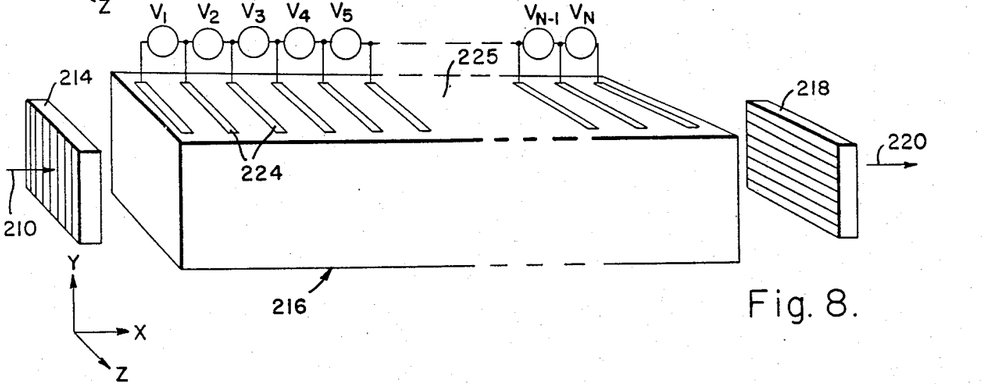

A further embodiment of the invention utilizing a single birefringent crystal is illustrated in FIG. 8. Components in the embodiment of FIG. 8 which are the same as or which function equivalently to corresponding components in the embodiment of FIG. 1 are designated by the same second and third reference numeral digits as their corresponding components in FIG. 1, along with the addition of a prefix numeral "2".

In the embodiment of FIG. 8 a plurality of parallel electrode strips 224 are disposed on broad surface 225 of elongated crystal 216 at spaced regions along the length of crystal 216, i.e., along the X-direction, with the strips 224 being oriented parallel to the Z-direction. As specific example, the crystal 216 may be of silver thiogallate, and the electrode strips 224 may be of aluminum or gold. Respective voltages $V_1, V_2, V_3 \ldots V_N$ are applied between respective pairs of successive strips 224 to achieve the desired optic axis variation in the respective intermediate regions of crystal 216 along the X-direction in the manner discussed above with reference to FIGS. 1–6. Moreover, in order to more effectively utilize the volume of crystal 216, a second array of electrode strips 224 may be provided on the broad surface of crystal 216 opposite to surface 225, with the respective strips of each array aligned with respective strips of the other array, and with the same control voltage pattern in both magnitude and polarity applied to respective strips of both arrays.

Figure 9:
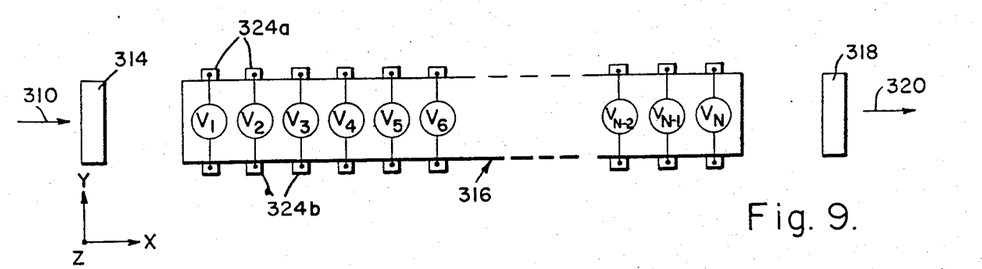
FIG. 9 is a longitudinal side view showing an electro-optic tunable optical filter according to a still further embodiment of the invention.

In the heretofore discussed embodiments of the invention the optic axis varying electric fields are applied parallel to or substantially parallel to the direction of light propagation, i.e., along the X-axis. However, filters according to the invention may be constructed with the electric fields applied transverse to the light propagation direction. An embodiment of the invention utilizing transverse electric fields is illustrated in FIG. 9. Components in the embodiment of FIG. 9 which are the same as or which function equivalently to corresponding components in the embodiment of FIG. 1 are designated by the same second and third reference numeral digits as their corresponding components in FIG. 1, along with the addition of a prefix numeral "3".

The embodiment of FIG. 9 is similar in structure to the embodiment of FIG. 8. However, since the electric fields are applied along a transverse direction, different classes of crystals may have to be employed. Specific exemplary crystals 316 which may be used in the embodiment of FIG. 9 are lithium tantalate ($LiTaO_3$) and cadmium sulfide (CdS). For the particular crystal classes exemplified by these materials, the crystallographic optic axis should be parallel to the Z-axis in the coordinate system shown in FIG. 9, i.e., perpendicular to the pass direction of the polarizer 314. Also, in the embodiment of FIG. 9, first and second series of spaced electrode strips 324a and 324b, respectively, are disposed on opposite broad surfaces of crystal 316 with respective ones of the strips 324a aligned with respective ones of the strips 324b along the Y-direction. The control voltages $V_1, V_2, V_3 \ldots V_N$ are applied between respective aligned pairs of electrode strips 324a and 324b along the Y-direction to achieve the desired optic axis variation in successive regions of the crystal 316 along the X-direction between the respective aligned pairs of electrode strips 324a and 324b in the manner described above with reference to FIGS. 1–6.

A specific design example will now be given for an electro-optic tunable filter which has been constructed according to the embodiment of FIG. 9. However, it should be understood that this example is given solely for illustrative purposes and that a wide range of alternate configurations, materials, and parameter values are also suitable and may be employed. Crystal 316 was a polished rectangular platelet of Y-cut lithium tantalate ($LiTaO_3$) having dimensions of approximately 18 mm × 0.14 mm × 11 mm along the X, Y, and Z-directions, respectively. Electrode strips 324a and 324b each had a length of 5 mm, a width of 25 μm and a spacing of 30 μm. The voltages $V_1, V_2, V_3 \ldots V_N$ all had the same magnitude of approximately 48 volts but were of alternating polarity along the X-direction. The input light beam 310 was white light from a tungsten filament. The output light beam 320 was a narrow band of blue light centered at a wavelength $\lambda_o = 0.457$ μm with a 3 db bandwidth of 72 Å. Additional filter design parameters discussed previously had the values listed below in Table I:

TABLE I

| | | |
|---|---|---|
| N | = | 100 |
| L | = | 5.5 mm |
| $\Lambda_f$ | = | 110 μm |
| ΔN | = | 0.00415 |
| α | = | 0.00785 radians |

As was mentioned above, the birefringent crystalline material used in a filter according to the invention must be capable of effectively changing the direction of its optic axis in a plane perpendicular to the light propagation path in response to an applied voltage along a given direction. This is achieved by utilizing the electro-optic effect to distort the optical properties of the material as described by an index ellipsoid relating the principal dielectric axes of the crystal to the indices of refraction for light polarized along the respective principal axes. A detailed discussion of the index ellipsoid and its application is found in the book *Introduction to Optical Electronics*, by Amnon Yariv; Holt, Rinehart and Winston, Inc.; 1971, Section 9.1, pp. 223–230.

As is explained in the referenced book, in response to an applied electric field $E_j$ along the j-direction, changes occur in the index ellipsoid constants $1/n^2$ along the i-direction or plane as determined by respective electro-optic coefficients $r_{ij}$, where $i = 1, 2, 3, 4, 5$ and $6$ and $j = 1, 2$ and $3$. Expressed mathematically, $$\Delta \left(\frac{1}{n^2}\right)_i = \sum_{j=1}^{3} r_{ij} E_j \tag{7}$$

The three index ellipsoid constant changes for $i = 1, 2$ and $3$ correspond to changes in the magnitude of the respective indices of refraction along the X, Y and Z-axes, respectively, while the three index ellipsoid constant changes for $i = 4, 5$ and $6$ correspond to effective optic axis rotations in the Y–Z, X–Z and X–Y planes, respectively, and it is this latter effect which is utilized in the present invention. Thus, a filter according to the invention requires a birefringent crystalline material having at least one non-zero electro-optic coefficient selected from the group consisting of the coefficients $r_{41}$, $r_{42}$, $r_{43}$, $r_{51}$, $r_{52}$, $r_{53}$, $r_{61}$, $r_{62}$, and $r_{63}$.

As a specific example, in the embodiment of FIG. 1 wherein the electric field is applied parallel to the X-axis and an effective optic axis variation is achieved in the Y–Z plane, the $r_{41}$ electro-optic coefficient is utilized. Thus, the material for the crystal plates 22 must have a non-zero electro-optic coefficient $r_{41}$. As a further example, in the embodiment of FIG. 9 an electric field applied parallel to the Y-axis produces an effective optic axis variation in the Y–Z plane. This effect involves the $r_{42}$ electro-optic coefficient so that the electro-optic crystal 316 must be of a material wherein this coefficient is non-zero.

More generally, when the electric field is applied along a direction parallel to the light path (longitudinal mode operation), a non-zero value of at least one of the electro-optic coefficients $r_{41}$, $r_{52}$ and $r_{63}$ is required. A complete listing of the various crystal systems and classes (point groups) and the applicable electro-optic coefficients $r_{ij}$ which may be used in a longitudinal mode filter according to the invention is given below in Table II. In this and the remaining tables conventional crystallographic nomenclature is employed as described in the book *Crystals and Light*, by Elizabeth A. Wood, Dover Publications, Inc., 1977, Chapter 5, pp. 53–61.

TABLE II

| | (Longitudinal) | |
|---|---|---|
| System | Class (Point Group) | Coefficient $r_{ij}$ (ij) |
| Cubic | None | |
| Hexagonal | 6 | 41 (= −52) |
| | 622 | 41 (= −52) |
| Trigonal | 3 | 41 (= −52) |
| | 32 | 41 (= −52) |
| Tetragonal | 4 | 41 (= −52) |
| | 4̄ | 41 (= +52) |
| | 422 | 41 (= −52) |
| | 4̄2m | 41 (= +52) |
| Orthorhombic | 222 | 41, 52, 63 |
| Monoclinic | 2 | 41, 52, 63 |
| Triclinic | 1 | 41, 52, 63 |

When the electric field is applied along a direction perpendicular to the light path (transverse mode operation, a non-zero value of at least one of the electro-optic coefficients $r_{42}$, $r_{43}$, $r_{51}$, $r_{53}$, $r_{61}$ and $r_{62}$ is required. A complete listing of the various crystal systems and classes (point groups) and the applicable electro-optic coefficients $r_{ij}$ for a transverse mode filter according to the invention is given below in Table III.

TABLE III

| | (Transverse) | |
|---|---|---|
| System | Class (Point Group) | Coefficient $r_{ij}$ (ij) |
| Cubic | None | |
| Hexagonal | 6 | 42 (= +51) |
| | 6 mm | 42 (= +51) |
| Trigonal | 3 | 42 (= +51) |
| | 3 m | 42 (= +51) |
| Tetragonal | 4 | 42 (= +51) |
| | 4̄ | 42 (= −51) |
| | 4 mm | 42 (= +51) |
| Orthorhombic | mm 2 | 42, 51 |
| Monoclinic | 2 | 43, 61 |
| | m | 42, 51, 53, 62 |
| Triclinic | 1 | 42, 43, 51, 53, 61, 62 |

In all of the embodiments of the invention discussed previously, both the direction of light propagation and the directions of the applied electric fields are along principal crystallographic axes. However, filters according to the invention may utilize crystallographic orientations in which the directions of light propagation and the applied electric fields are not parallel to any of the principal crystallographic axes.

As a specific example, if the crystal is cut in an orientation rotated about the optic axis by an angle $\theta$, a new electro-optic coefficient $r'_{41}$ is generated for longitudinal field application given by $$r'_{41} = r_{41} \cos^2 \theta - r_{52} \sin^2 \theta + (r_{42} - r_{51}) \cos \theta \sin \theta \tag{8}$$

Thus, if $r_{41} = r_{52} = 0$, but $r_{42}$ and/or $r_{51} \neq 0$ for a particular desired crystal, that crystal can be used in a longitudinal mode filter after rotation, although it is basically a transverse mode crystal. Further rotations about either the crystallographic X or Y-axes, or both, can generate new effective electro-optic coefficients which are linear combinations of original principal axis electro-optic coefficients weighted by a geometric angle function. Such new effective coefficients may be suitable for filters according to the invention even though the original coefficients were not. This allows additional flexability in choice of crystal class to take advantage of those electro-optic coefficients having large values.

Tables IV and V below present complete listings of the crystal systems and classes (point groups) along with the applicable new effective electro-optic coefficients $r'_{ij}$ resulting from crystal cuts in rotated orientations with respect to the three principal crystallographic axes for longitudinal and transverse mode filters, respectively. In Tables IV and V the single asterisks indicate new allowed crystal classes for the designated operating mode, while the double asterisks indicate new crystal classes not otherwise allowed for either operating mode.

TABLE IV

| | (Longitudinal - Rotated) | |
|---|---|---|
| System | Class (Point Group) | Coefficient $r_{ij}$ (ij) |
| Cubic | None | |
| Hexagonal | 6** | 41, 52, 63 |
| | 6 m 2** | 41, 63 |
| Trigonal | 3 | 41, 52, 63 |
| | 32 | 52, 63 |
| | 3 m* | 41, 63 |

TABLE IV-continued (Longitudinal - Rotated)

| System | Class (Point Group) | Coefficient $r_{ij}$ (ij) |
|---|---|---|
| Tetragonal | 4 | 41, 52 |
| Orthorhombic | mm 2* | 41, 52 |
| Monoclinic | 2 | 41, 63 |
|  | m* | 41, 52, 63 |
| Triclinic | 1 | 41, 52, 63 |

TABLE V (Transverse - Rotated)

| System | Class (Point Group) | Coefficient $r'_{ij}$ (ij) |
|---|---|---|
| Cubic | None |  |
| Hexagonal | 6 | 43, 53, 61, 62 |
|  | 622* | 43, 53, 61, 62 |
| Trigonal | 3 | 43, 53, 61, 62 |
|  | 32* | 43, 53, 61, 62 |
| Tetragonal | 4 | 43, 53, 61, 62 |
|  | $\bar{4}$ | 42, 43, 51, 53, 61, 62 |
|  | 422* | 43, 53, 61, 62 |
|  | $\bar{4}$2 m* | 42, 43, 51, 53, 61, 62 |
| Orthorhombic | 222* | 42, 43, 51, 53, 61, 62 |
| Monoclinic | 2 | 42, 43, 51, 53, 61, 62 |
| Triclinic | 1 | 42, 43, 51, 53, 61, 62 |

It may be seen from the foregoing that the present invention provides an electronically tunable optical filter of very high versatility. Not only does it afford great design flexibility for achieving various filter requirements, but also the filter may be electronically programmed to provide an extremely wide variety of transmission characteristics. At the same time, an electro-optically tunable optical filter according to the invention consumes substantially less power than acousto-optic tunable optical filters. In fact, the only power dissipation with a filter according to the invention results from small leakage current associated with the applied electric field.

Although the present invention has been shown and described with reference to particular embodiments, nevertheless, various changes and modifications which are obvious to a person skilled in the art to which the invention pertains are deemed to lie within the spirit, scope and contemplation of the invention.

What is claimed is:

1. An optical filter comprising:
first and second polarizers spaced from one another along a predetermined path and having their respective pass directions for polarized light oriented at a desired angular relationship with respect to one another;
a birefringent crystalline medium disposed along said path between said first and second polarizers and oriented with its optic axis perpendicular to said path, said medium having at least one non-zero electro-optic coefficient selected from the group consisting of the coefficients $r_{41}$, $r_{42}$, $r_{43}$, $r_{51}$, $r_{52}$, $r_{53}$, $r_{61}$, $r_{62}$ and $r_{63}$;
means for directing a beam of light including a plurality of wavelengths through said first polarizer and said medium along said path; and
means for applying to successive regions of said medium along said path a dc electric field which is spatially varying along said path to electro-optically produce in said medium an effective variation of the optic axis thereof about the pass direction of said first polarizer in a plane perpendicular to said path as a function of distance along said path with a predetermined spatial variation such that at least one of said wavelengths in said beam is passed by said second polarizer and at least another of said wavelengths is rejected by said second polarizer.

2. An optical filter according to claim 1 wherein said means for applying said electric field to said medium includes programmable voltage source means for generating and applying to said successive regions a plurality of dc control voltages which are variable in accordance with a desired transmission characteristic as a function of wavelength for light traversing said filter along said path.

3. An optical filter according to claim 1 wherein said dc electric field is spatially periodic along said path and electro-optically produces in said medium an effective oscillation of the optic axis thereof about the pass direction of said first polarizer in a plane perpendicular to said path as a function of distance along said path with a predetermined spatial variation and periodicity to achieve a desired transmission characteristic as a function of wavelength for light traversing said filter along said path.

4. An optical filter according to claim 1 wherein said medium is oriented with its optic axis parallel to the pass direction of said first polarizer.

5. An optical filter according to claim 1 wherein said medium is oriented with its optic axis perpendicular to the pass direction of said first polarizer.

6. An optical filter according to claim 1 wherein said non-zero electro-optic coefficient is selected from the group consisting of the coefficients $r_{41}$, $r_{52}$ and $r_{63}$, and said electric field is applied to said medium along a direction substantially parallel to said path.

7. An optical filter according to claim 6 wherein said crystalline medium includes a series of birefringent crystal plates disposed sequentially along said path, each crystal plate having a pair of opposite broad surfaces disposed substantially perpendicular to said path; and said means for applying said electric field to said medium includes a layer of transparent electrically conductive material attached to each of said broad surfaces, and means for applying control voltages between respective pairs of said electrically conductive layers on respective ones of said crystal plates.

8. An optical filter according to claim 6 wherein said crystalline medium includes an elongated birefringent crystal disposed along said path and defining along its length a plurality of alternating regions of low resistivity and high resistivity; and said means for applying said electric field to said medium includes means for applying control voltages between respective pairs of successive ones of said regions of low resistivity.

9. An optical filter according to claim 6 wherein said crystalline medium includes an elongated birefringent crystal disposed along said path; and said means for applying said electric field to said medium includes a plurality of electrode strips disposed on a broad surface of said crystal at spaced regions along the length thereof and oriented substantially perpendicular to said path, and means for applying control voltages between respective pairs of successive ones of said strips.

10. An optical filter according to claim 6 wherein said crystalline medium includes an elongated birefringent crystal disposed along said path; and said means for applying said electric field to said medium includes first and second series of electrode strips respectively disposed on opposite broad surfaces of said crystal at spaced regions along the length thereof, each of said strips being oriented substantially perpendicular to said path with respective ones of said strips of said first series being substantially aligned with respective ones of said strips of said second series, and means for applying control voltages between respective pairs of successive ones of said strips of said first series and successive ones of said strips of said second series.

11. An optical filter according to claim 1 wherein said non-zero electro-optic coefficient is selected from the group consisting of the coefficients $r_{42}$, $r_{43}$, $r_{51}$, $r_{53}$, $r_{61}$ and $r_{62}$; and said electric field is applied to said medium along a direction substantially perpendicular to said path.

12. An optical filter according to claim 11 wherein said crystalline medium includes an elongated birefringent crystal disposed along said path; and said means for applying said electric field to said medium includes first and second series of electrode strips respectively disposed on opposite broad surfaces of said crystal at spaced regions along the length thereof, each of said strips being oriented substantially perpendicular to said path with respective ones of said strips of said first series being substantially aligned with respective ones of said strips of said second series, and means for applying control voltages between respective aligned pairs of said strips of said first and second series.

13. An optical filter according to claim 11 wherein said crystalline medium is lithium tantalate.

14. An optical filter according to claim 11 wherein said crystalline medium is cadmium sulfide.

15. An optical filter according to claim 1 wherein said crystalline medium is silver thiogallate.

* * * * *